United States Patent [19]
Wada et al.

[11] 4,281,355
[45] Jul. 28, 1981

[54] DIGITAL AUDIO SIGNAL RECORDER

[75] Inventors: Ryoichi Wada, Habikino; Mitsuharu Tsuchiya, Katano; Kanji Odagi, Neyagawa; Takanori Senoo, Katano, all of Japan

[73] Assignee: Matsushita Electric Industrial Co., Ltd., Osaka, Japan

[21] Appl. No.: 7,851

[22] Filed: Jan. 29, 1979

[30] Foreign Application Priority Data

Feb. 1, 1978 [JP] Japan .................................. 53-10980
Feb. 2, 1978 [JP] Japan .................................. 53-11275

[51] Int. Cl.³ ............................ G11B 5/00; G11B 5/09
[52] U.S. Cl. ........................................ 360/32; 360/53
[58] Field of Search ............... 360/32, 38, 47, 53; 340/146.1 A, 146.1 AJ, 146.1 BE, 146.1 F

[56] References Cited

U.S. PATENT DOCUMENTS

| 3,979,721 | 9/1976 | Umemoto et al. ...................... 360/32 |
| 4,030,129 | 6/1977 | Whitlock ................................ 360/32 |
| 4,138,694 | 2/1979 | Doi et al. .............................. 360/32 |
| 4,146,099 | 3/1979 | Matsushima et al. .................. 360/32 |

OTHER PUBLICATIONS

"On Several Standards for Converting PCM Signals into Video Signals", Doi et al., Journel of Audio Engineering Society, 9/78, vol. 76 #9.

Primary Examiner—Vincent P. Canney
Attorney, Agent, or Firm—Wenderoth, Lind & Ponack

[57] ABSTRACT

A digital audio signal recorder for obtaining coded signals having a first check code generator for generating the sum of module 2 for each bit of pieces of predetermined sampled data; and further has a circuit operatively coupled to said generator for arranging the sampled data, a first check code and a second check code at positions spaced on a time axis from each other. This invention also provides a method of generating such a digital audio signal. This invention is advantageous because it makes possible a low rate of redundancy and a simple decode circuit.

13 Claims, 10 Drawing Figures

| x | Lnx | Rnx | Pnx |
|---|---|---|---|
| 1 | $L_1$ | $R_{71}$ | $P_{36}$ |
| 2 | $L_2$ | $R_{72}$ | $P_{37}$ |
| 3 | $L_3$ | $R_{73}$ | $P_{38}$ |
| 4 | $L_4$ | $R_{74}$ | $P_{39}$ |
| 34 | $L_{34}$ | $R_{104}$ | $P_{69}$ |
| 35 | $L_{35}$ | $R_{105}$ | $P_{70}$ |
| 36 | $L_{36}$ | $R_1$ | $P_{71}$ |
| 37 | $L_{37}$ | $R_2$ | $P_{72}$ |
| 38 | $L_{38}$ | $R_3$ | $P_{73}$ |
| 69 | $L_{69}$ | $R_{34}$ | $P_{104}$ |
| 70 | $L_{70}$ | $R_{35}$ | $P_{105}$ |
| 71 | $L_{71}$ | $R_{36}$ | $P_1$ |
| 72 | $L_{72}$ | $R_{37}$ | $P_2$ |
| 73 | $L_{73}$ | $R_{38}$ | $P_3$ |
| 103 | $L_{103}$ | $R_{68}$ | $P_{33}$ |
| 104 | $L_{104}$ | $R_{69}$ | $P_{34}$ |
| 105 | $L_{105}$ | $R_{70}$ | $P_{35}$ |

DIGITAL AUDIO SIGNAL RECORDER

This invention relates to a method of forming a digitally coded signal and to a recorder and/or reproducing apparatus for such a digitally coded signal which is useful as an apparatus for recording and/or reproducing audio signals, such as for a video tape recorder (VTR hereinafter), after they are converted to PCM (pulse code modulation) signals.

When PCM signals are recorded by using a VTR, errors are likely to occur in the reproduced PCM signals due to drop out. Errors due to drop out have the form of burst error, and are likely to cause loss of many pieces of data at one time. The quality of the reproduced audio signals is thus determined by how the errors due to drop out are treated.

Conventionally, for reducing such data errors due to drop out, two identical pieces of data are written in at two positions sufficiently spaced in time, or error correcting codes such as ORC (optimum redundancy code) signals are used. The former method is disadvantageous in that since check codes are additionally used for detecting which one of the two same pieces of data is erroneous, the signal redundancy becomes high. The latter method is disadvantageous in that a very complicated decode circuit is necessary.

It is an object of this invention to provide a method of generating digitally coded signals and apparatus for recording/reproducing such coded signals which operates with low redundancy and which are influenced hardly at all by signal drop out.

This object is achieved according to this invention by: providing a first check code by the sum of module 2 of pieces of each bit of sets of predetermined sampled data; and further arranging the sampled data, the first check code and a second check code at positions spaced on a time axis from each other.

More specifically, according to this invention, a digital audio signal recorder for digitalizing analog signals in an audio frequency band to pulse-code-modulated signals and for recording the digitallized signals on a recording medium comprises: first check code generating means for producing a first check code by the sum of module 2 per bit of pieces of digitally sampled data; memory means for positioning said sampled data and said first check code at addresses therein spaced from each other along a time axis; and second check code generating means for producing a second check code to be added to said sampled data and said first check code, said sampled data, said first check code and said second check code being recorded on a recording medium. Further according to this invention, a digital audio signal reproducing apparatus for reproducing digitallized signals, recorded on a recording medium, which digitallized signals are produced by digitallizing analog signals in an audio frequency band to pulse-code-modulated signals; producing a first check code for the pieces of sampled data for a given sampling time by the sum of module 2 per bit of the pieces of sampled data; placing said pieces of sampled data and first check code at addresses spaced from each other along a time axis; and adding a second check code to said sampled data and said first check codes, comprises: a second check code detecting means for checking the second check code contained in the reproduced signals; reproduction memory means for rearranging the order of sampled data of the recorded signals in the original order of sampled signals as they were at the time of recording; and output means for correcting an erroneous pieces of data in a set of sampled data and the first check code by the sum of module 2 per bit of the remaining correct signals in said set, when said erroneous data is detected by said second check code detecting means. Further, according to this invention, a method of forming digitally coded signals comprises: generating a first check code by the sum of module 2 per bit of pieces of data for a predetermined time of sampling; and positioning said sampled data, said first check code and a second check code for correcting data error, at positions along a time axis and spaced from each other.

According to a further development of this invention, a plurality of pieces of the sampled data and a plurality of the first check codes are subjected to cyclic spaced arrangement to position these signals equidistantly along a time axis in a manner such that the length that the pieces of sampled data and first check codes occupy, after said arrangement, is the same as that which the pieces of the sampled data and first check codes occupy before said arrangement; that after said arrangement, the distance between the pieces of sampled data and the first check code in each set of pieces of sampled data and first check code is longer than the distance along the time axis between the pieces of sampled data and first check code in each set of pieces of sampled data and first check code before said arrangement; and that the order of said pieces of sampled data and first check code in each set, after said arrangement, is the same as that of said pieces of sampled data and first check code in said each set before said arrangement, so as to complete interleaving of signals in a constant signal length. According to a still further development of this invention, when two or more pieces of a set of sampled data and first check code are detected as being erroneous signals by said second check code detecting means, said output means supplies, as its output, an arithmetic mean of a previous set and a subsequent set of sampled data and first check code.

This invention will be described in detail with the aid of the accompanying drawings, wherein.

According to this invention, a first check code is produced by the sum of module 2 for each bit of a plurality of pieces of data. The above data and a second check code, which is for detecting data errors due to drop out, are positioned (written) at positions spaced in time. Thereby, even if one piece of data is lost due to drop out, complete decoding becomes possible by the first check code. Thus, the redundancy is low, and coded signals (and apparatus for recording/reproducing the coded signals) are less influenced by drop out in e.g. VTR.

Figure 1:
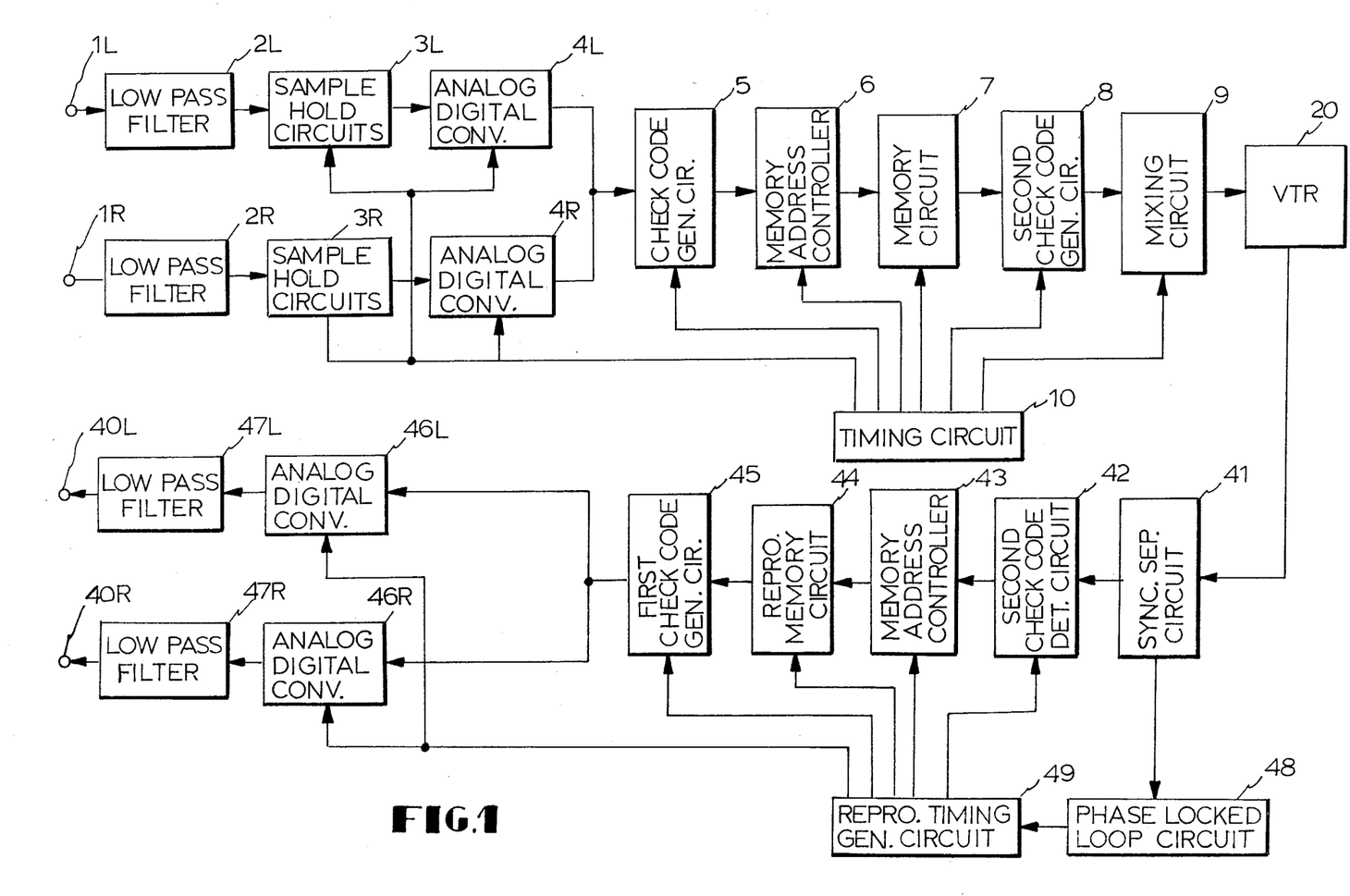
FIG. 1 is a block diagram of a main portion of a PCM tape recorder having this invention applied thereto.

Hereinafter, this invention will be described with reference to the accompanying drawings showing the application of this invention to a 2-channel PCM tape recorder. Referring to FIG. 1, a stereophonic left signal and a stereophonic right signal supplied to input terminals 1L and 1R are passed through low pass filters 2L and 2R. Thereby, high frequency components which would produce spurious noises during a sampling operation are removed. These signals are then sampled by sample-hold circuits 3L and 3R, and are then converted to digital signals by A-D (analog-digital) converters 4L and 4R, respectively. By the sum of module 2 for each bit of the audio signals of the left and right channels of the digitally converted signals, a first check code is produced by a first check code generating circuit 5, and is fed to a memory address controller 6. The memory address controller 6 functions, when the memory circuit is being subjected to a reading-out operation, to store the three data, i.e. the digitalized signals and the check code, to be written in the memory in the memory address controller, and soon after the completion of the reading-out operation of the memory circuit, these data are written in the memory. This function is necessary so that a conventional read-write memory can be used for the memory circuit 7, because such a read-write memory cannot perform read-out and write-in of different addresses at the same time.

The output of the memory circuit 7 is fed to a second check code generating circuit 8, and is thereat subjected to parallel-to-serial conversion, and is given a second check code 2 for detecting drop out. The thus treated output of the second check code generating circuit, having the second check code added thereto, is fed to a mixing circuit 9. The mixing circuit 9 adds sync signals as in television signals to the input signal from the second check code generating circuit for making possible the recording of the mixing circuit output by a rotary head type VTR 20. The thus treated output signal of the mixing circuit is recorded a magnetic tape through a recording circuit in the VTR, which circuit comprises an FM modulator.

In FIG. 1, reference numeral 10 designates a timing circuit for: applying gate pulses to the sample-hold circuits 3L and 3R; applying clock pulses and conversion initiation signals to the A-D converters 4L and 4R; applying various timing pulses to the first check code generating circuit 5, the memory address controller 6, the memory circuit 7 and the second check code generating circuit 8; and also applying sync signals to the mixing circuit 9.

The recording operation has been described hereinabove. In the following, reproducing will be described.

For reproducing, the output signal of the VTR 20 which has similar waveforms to the above-described recorded waveforms, is fed to a sync separation circuit 41. The data portion of the output signal of the VTR is thereat taken out, and is fed to a second check code detecting circuit 42. The second check code detecting circuit 42 checks for second check codes included in the reproduced signals, to determine whether the reproduced data have errors therein. The results of the checking and the data converted by parallel-to-serial conversion are fed to a reproduction memory address controller 43, and are written in a reproduction memory circuit 44. The reproduction memory circuit 44 expands the fed data along a time axis, as compared to the distance along the time axis during recording, and removes jitter (time base error) in the data. Thus, the output of the reproduction memory circuit 44 has no data dropout portion and no time base error. This output signal is fed to a first check code detecting circuit 45, and the signal having errors therein due to drop out is corrected by the sum of module 2 of the other two signals, and the thus treated left and right signals are fed to D-A (digital-analog) converters 46L and 46R, respectively, and become analog signals. Thereafter, these analog signals are passed through low pass filters 47L and 47R for eliminating unwanted frequency components therein, and are then fed to output terminals 40L and 40R, respectively.

On the other hand, sync signals in the reproduced signals, separated by the sync separation circuit 41, are supplied to a PLL (phase-locked loop) circuit 48, and are then multiplied and fed to a reproduction timing generating circuit 49, which generates and supplies timing signals, necessary for reproduction operation, to the second check code detecting circuit 42, the reproduction memory address controller 43, the reproduction memory circuit 44, the first check code detecting circuit 45, and the D-A converters 46L, 46R, respectively.

When the recording/reproduction is performed by a PCM system using a helical scanning two-head type VTR as the VTR 20, it is necessary that the signals to be treated have forms similar to those of television signals because of the treatment of clamp by the recording/reproducing circuit system in the VTR and because of the influence of skew at the head switching position, etc. That is, it is necessary that those signals contain horizontal sync signal-like signals and vertical sync signal-like signals. However, it is not necessary that those signals be identical to the television signals. Those signals can have forms in a pretty wide range so long as they do not damage the operation of the recording/reproducing system of the VTR.

Figure 2A:
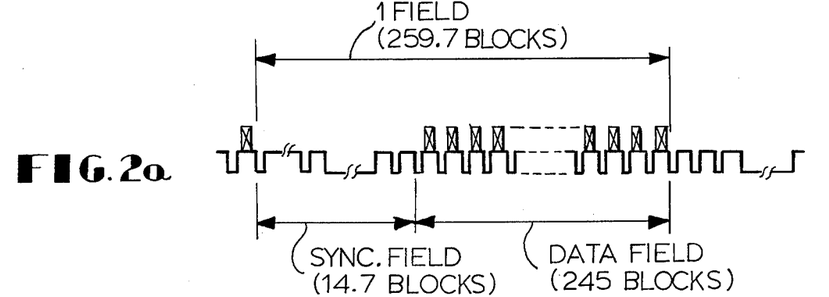
FIGS. 2(A), 2(B) and 2(C) are waveforms of recorded signals formed in accordance with this invention.

FIG. 2 is a chart of the main portions of waveforms showing examples of signal types. In the exemplary signal of FIG. 2(A), the data rate is about 2.335 MHz, and one field is composed of 38,955 clocks or clock pulses, so it exactly coincides with 16.683 ms which is a field period of the standard NTSC signals. The signal corresponding to H (horizontal) sync signal in television signals is a block sync signal, and one field thereof is composed of 259.7 blocks. Out of these 259.7 blocks, 245 blocks are used for data, and the remaining 14.7 blocks are shared as sync fields.

Figure 2B:
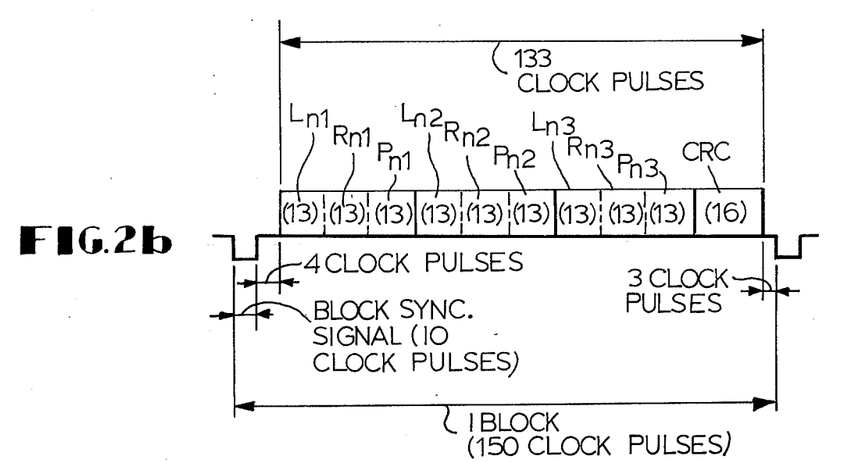

FIG. 2(B) shows the portion of data in one block. The data in one block is composed of digitallized sampled pieces of data $L_{n1}$, $R_{n1}$, $L_{n2}$, $R_{n2}$, $L_{n3}$ and $R_{n3}$ for both left and right channels, first check codes $P_{n1}$, $P_{n2}$, $P_{n3}$, all having 13 bits and $L_{n1}$, $R_{n1}$ and $P_{n1}$ constituting a set of pieces of data plus a first check code and a CRC (cyclic redundancy check code) of 16 bits which is the second check code. The data occupies 133 clocks out of 150 clocks in one block. Therefore, each field has 735 sets including data for both left and right channels, and the bit rate per block is 44.056 kHz.

Figure 2C:
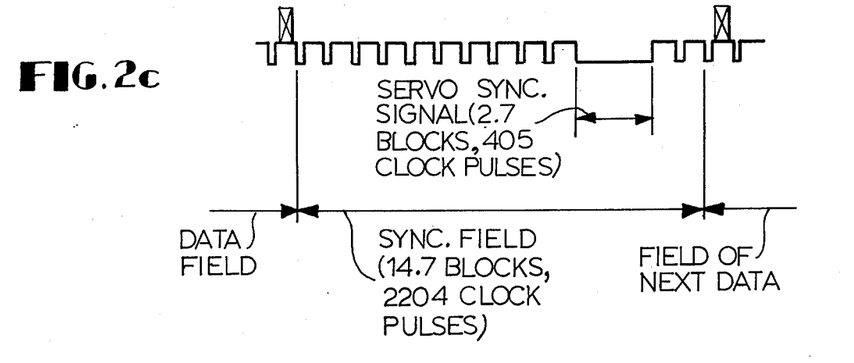

Meanwhile, the sync field is used for head switching of the VTR and for supplying reference signals for a servo, and is composed of 2.7 blocks of a servo sync signal corresponding to the vertical sync signal in television signals, 10 blocks empty of data ahead of the servo sync signal, and 2 empty blocks after the servo sync signal, the total number thus being 14.7 blocks, as shown in FIG. 2(C). The head switching during helical scanning in a two-head type VTR is usually done during the 10 empty blocks before the servo sync signal, so it does not produce a bad influence on the data field.

Figures 3, 4:
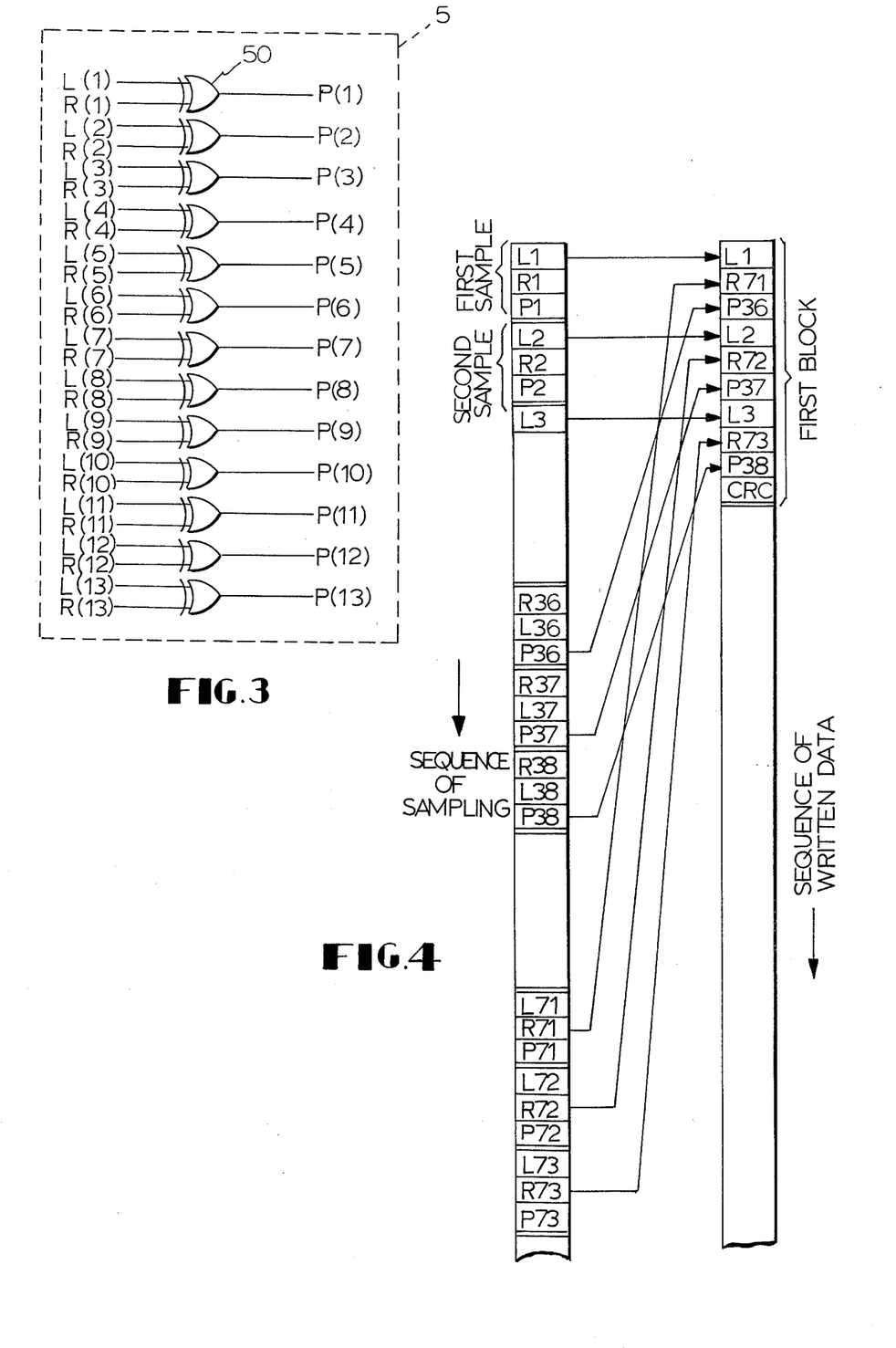
FIG. 3 is an example of a circuit for producing a first check code in accordance with this invention.
FIG. 4 is a chart showing interleaving of signals.

The first check code P is produced by the sum of module 2 of each bit of pieces of data having 13 bits for both left and right channels which data are sampled at the same time point. FIG. 3 shows a circuit arrangement therefor. Referring to FIG. 3, numbers in the parentheses represent bit positions, and the reference numeral 50 designates an exclusive OR circuit for the module 2 operation. For the sake of explanation, sampled signals and first check codes are labelled $L_1, L_2, \ldots, R_1, R_2, \ldots, P_1, P_2, \ldots$, the subscripts representing the sequence of the sampling time points. Each of the pieces of data and each first check code having the same subscript number, such as $L_1$, $R_1$ and $P_1$, is in a certain relation with the other two of the pieces of data and check code in the set for each time point, which relation is derived from the sum of module 2 of the bits for the other two pieces of the data and the check code. Namely, using $\oplus$ as representing the sum of module 2:

$$L_1 = R_1 \oplus P_1$$

$$R_1 = L_1 \oplus P_1$$

$$P_1 = R_1 \oplus L_1$$

The last one of the above three equations itself represents the process of deriving check code $P_1$, which then becomes another piece of data in the set $L_1$, $R_1$, $P_1$, and the other two equations can be easily derived from this equation. That is, when the above three pieces of data are recorded, even if one of them is dropped out due to the drop-out or other causes, the dropped piece of data can be reproduced from the other two remaining pieces of data. In VTR, most of the errors actually occurring therein are those of the burst type drop out. Thus, in order to prevent these three pieces of data from being simultaneously dropped due to the burst type errors, these three pieces of data are recorded at positions spaced from each other by a length greater than the burst error length.

In the example of this invention, 735 sets of pieces of data representing the sampled signals in one field are divided into 7 groups each having 105 sets. In each of the groups, the three pieces of data in each set are spaced from each other a distance equal to the space occupied by 35 sets of data. This in terms of block number is 11.67 blocks. This situation is shown in FIG. 4. As is apparent from this drawing, each block is composed of data for three sets of signals, L, R and P and the signals within each set have subscript numbers which differ from each other by 35, i.e, 35 sets. i.e. 35 samples.

Using $L_{n(x)}$, $R_{n(x)}$ and $P_{n(x)}$ as representing the sequence of the written data (where $x=1,2,\ldots,105$), they can be expressed as follows:

$$L_{n(x)} = L_x$$

$$R_{n(x)} = R_{(x+35) \bmod 105}$$

$$P_{n(x)} = P_{(x+70) \bmod 105}$$

The positional arrangement of them is as follows. That is, the R signal appears at a position 35 sets after the L signal. The P signal appears at a position 35 sets after the R signal. If the position at which the R or P signal is to appear 35 sets after the L or R signal, respectively, is outside the group, such R or P signal is brought back so as to be positioned at an earlier positions, as exemplarily shown in FIG. 4.

Thereby, the data for the respective signals in one set are arranged so as to be interleaved in one group at spaced positions so that data for the signals in each set are spaced from each other by at least 35 sets. Such an arrangement is hereinafter called a cyclic spaced arrangement.

The above description is for the first group, but the data for the signals in each of the second et seq. groups are also interleaved in a cyclic spaced arrangement similar to that in the first group.

The interleaved arrangement in one group can be made without bringing data for the signals of latter positions of the group back to earlier positions. That is, the arrangement is always with data for the R signals at positions 35 sets after the positions of data for the L signals, and the data for P signals at positions 35 sets after the positions of data for the R signals. In such an arrangement, the interleaving is not completed, but such arrangement provides an advantage that the processing circuit arrangement can be made simple. Thus, such arrangement is designated a simple delayed arrangement. But, as described above, in this example of this invention, the interleaving method according to the above-mentioned cyclic spaced arrangement is employed instead of the simple delayed, in order to enable editing of signals just as in the case of usual images on a TV screen.

Figures 5, 7:
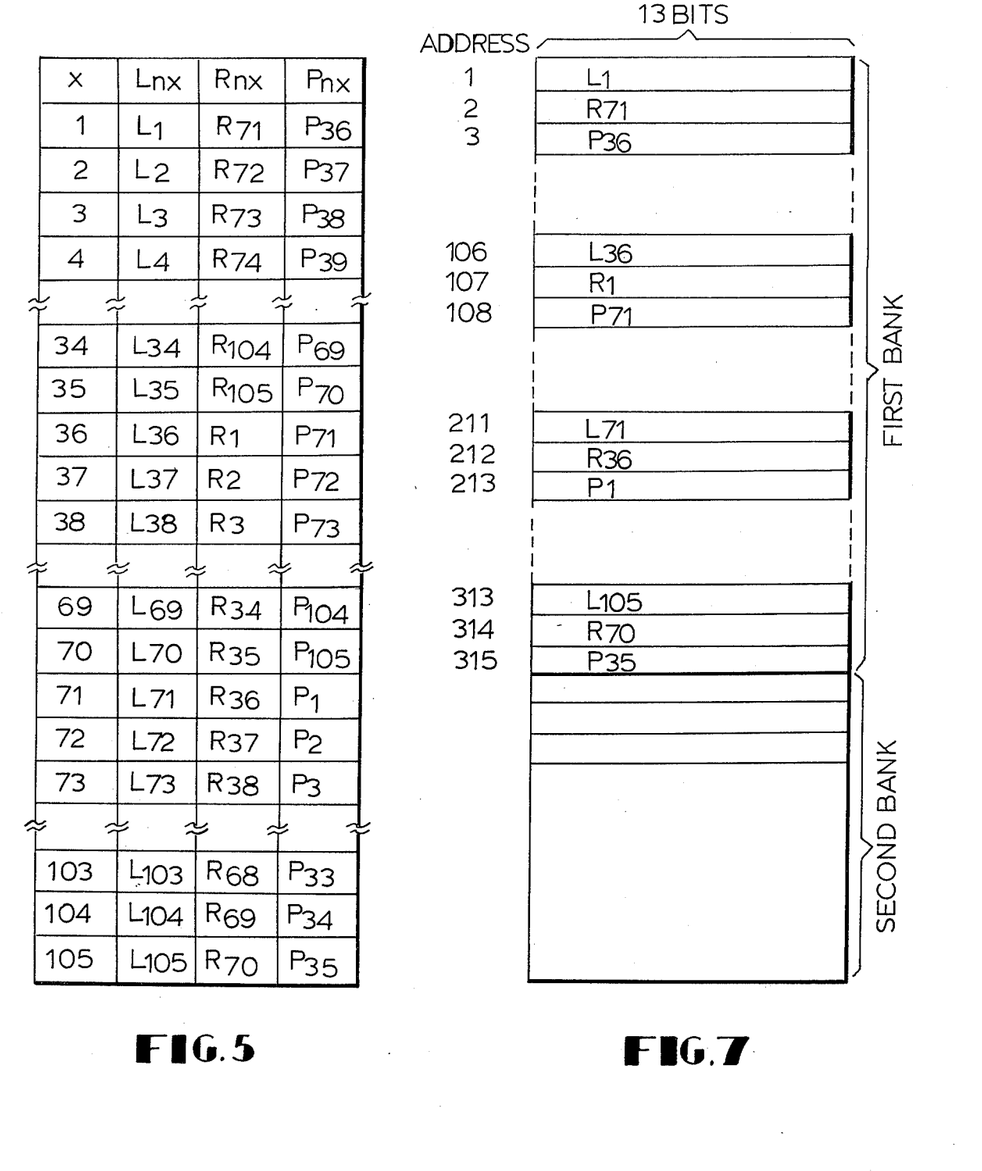
FIG. 5 is a chart showing in greater detail than FIG. 4 the interleaving signals.
FIG. 7 is a chart for describing the contents of a memory for performing interleaving of signals.

FIG. 5 shows the details of the manner of the interleaving. Referring to FIG. 5, x represents the time sequence of the data for the recorded signals, and the subscript in the table represent the sequence of samples. As is apparent from this table or chart, the data for the signals sampled at the same time point are interleaved in the recorded data at positions spaced from each other by the length of at least 35 sets of data. Since such interleaving is done by processing along a time axis, such interleaving is done by using a memory. In order to form recorded signals as shown in FIGS. 2a–2c , the sampled data equidistantly spaced along the time axis should be compressed on time axis. This compression is also done by using a memory. According to this example of this invention, these two processes are carried out by using the same memory.

Figure 6:
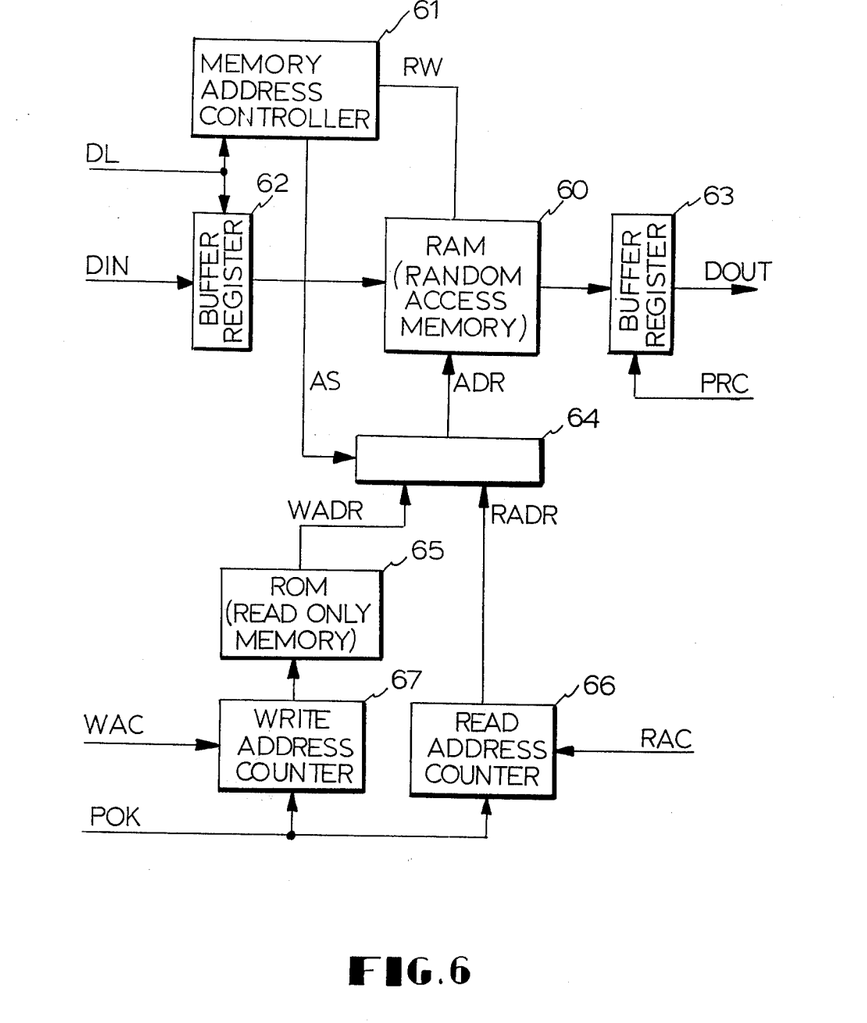
FIG. 6 is a block diagram of a main portion of an example of a circuit for producing interleaving of signals.

FIG. 6 is a block diagram showing an example of a memory circuit which performs the above processes, and also showing peripheral circuits. Referring thereto, sampled audio signals and first check codes are sequentially fed to a DIN line, and are temporarily stored in a buffer register 62 by a data latch signal DL. The data latch signal also sets a memory address controller 61. The memory address controller 61 detects, by the data latch signal DL, the fact that data for the sampled signals has been fed into the buffer register 62. Then, (i) immediately if random access memory (RAM) 60 is not in the read-out operation, or (ii) after the completion of the read-out operation of the RAM 60 if the RAM 60 is in a read-out operation, the memory address controller 61 generates an address select signal AS to switch address ine ADR of the RAM 60 to write-address WADR, and also a read-write signal RW to write the data (latched at the buffer register 62) to the address in the RAM 60 directed by the write address WADR.

Otherwise, the address line ADR is connected to output RADR of read address counter 66, and thus the data at the address directed by the read address RADR is fed to output buffer register 63, and the output signal of the buffer register 63 is fed to DOUT line in accordance with the timing controlled by read clock PRC. The read address counter 66 is a conventional counter circuit, and operates to sequentially count up in accordance with read address clock RAC so as to sequentially designate the content of the RAM 60 to be fed to its output.

Write address counter 67 is also a usual counter circuit, and similarly operates to count up in accordance with write address clock WAC. However, the output of the write address counter 67 is fed to ROM 65, and actual write address WADR is obtained as an output of the ROM 65. This is to perform the above described interleaving processing of sampled data.

POK signal is a signal for clearing the write address counter 67 and the read address counter 66 upon turning-on of power supply of the apparatus, and the read address RADR and the write address WADR are designed to start their operations from predetermined positions upon the turning-on of the power supply.

Hereinafter, the details of the interleaving processing will be described. As shown in FIG. 7, in the RAM 60, one word is composed of 13 bits, and one memory bank is composed of 315 words. The RAM 60 has two memory banks each of 315 words, and hence has 630 words. Each memory bank has a capacity to store all the data in each one of the above described groups.

Now, referring to FIG. 6, upon turning-on of the power supply, both the read address counter 66 and the write address counter 67 are reset, and the read address counter 66 starts sequentially reading out data from the first address of the second bank, namely the 316th data.

On the other hand, the sampled audio signals appear on the DIN line in the sequence of $L_1$, $R_1$, $P_1$, $L_2$, $R_2$, $P_2$, .... Thus, every time the write address counter 67 counts up, the address is replaced by the ROM 65 in a manner to produce the interleaving, whereby each set of input signals such as $L_1$, $R_1$ and $P_1$ are written in the RAM 60 at spaced addresses corresponding to the time-base order in which the signals are to be recorded on the VTR. For example, the input $L_1$, $R_1$ and $P_1$ signals are written in the 1st address, 107th address and 213th address, respectively, in the RAM 60.

Therefore, at first write-in and read-out start for one group separately from the other groups. If the write-in is done in a similar manner to that of read-out, the spacing of addresses upon read-out are the same as those upon write-in. But, as described above, the signals written on the VTR have a sync field having no data signals therein. So, in a data field, the speed of reading out data is faster than that of writing data, while in a sync field, write-in may be done, but no read-out is done. This means that the spacing of addresses in the RAM 60 upon read-out change in comparison with those upon write-in as time passes. In this case, the read address should not overtake write address. But, it can be easily confirmed by calculation that such overtaking of write address by read address does not occur in the case of two banks of memories when the write-in and read-out start from the position of a servo sync signal after the turning-on of the power supply.

Upon reading out the interleaved recorded PCM signals from the VTR, the recorded signals are rearranged to the order of the original sampled signals by using memories. But upon reading-out, in general, additional memories become necessary for absorbing jitters caused by the VTR. Further, in the memory, 1 bit is additionally provided for the second check code inserted into each block, namely for checking of CRC codes of 16 bits in this example of this invention, so that one word is composed of 13 bits plus one bit, 14 bits in total. The other portions are substantially the same as those of the above described interleaving circuit. That is, in this example of this invention, the memory has 3 banks each of 315 words, each word of which is composed of 14 bits. The write-in is designed to start from the beginning of the first bank, and the read-out is designed to start from the beginning of the second bank. The other circuit arrangements are identical to those shown in FIG. 6.

Figure 8:
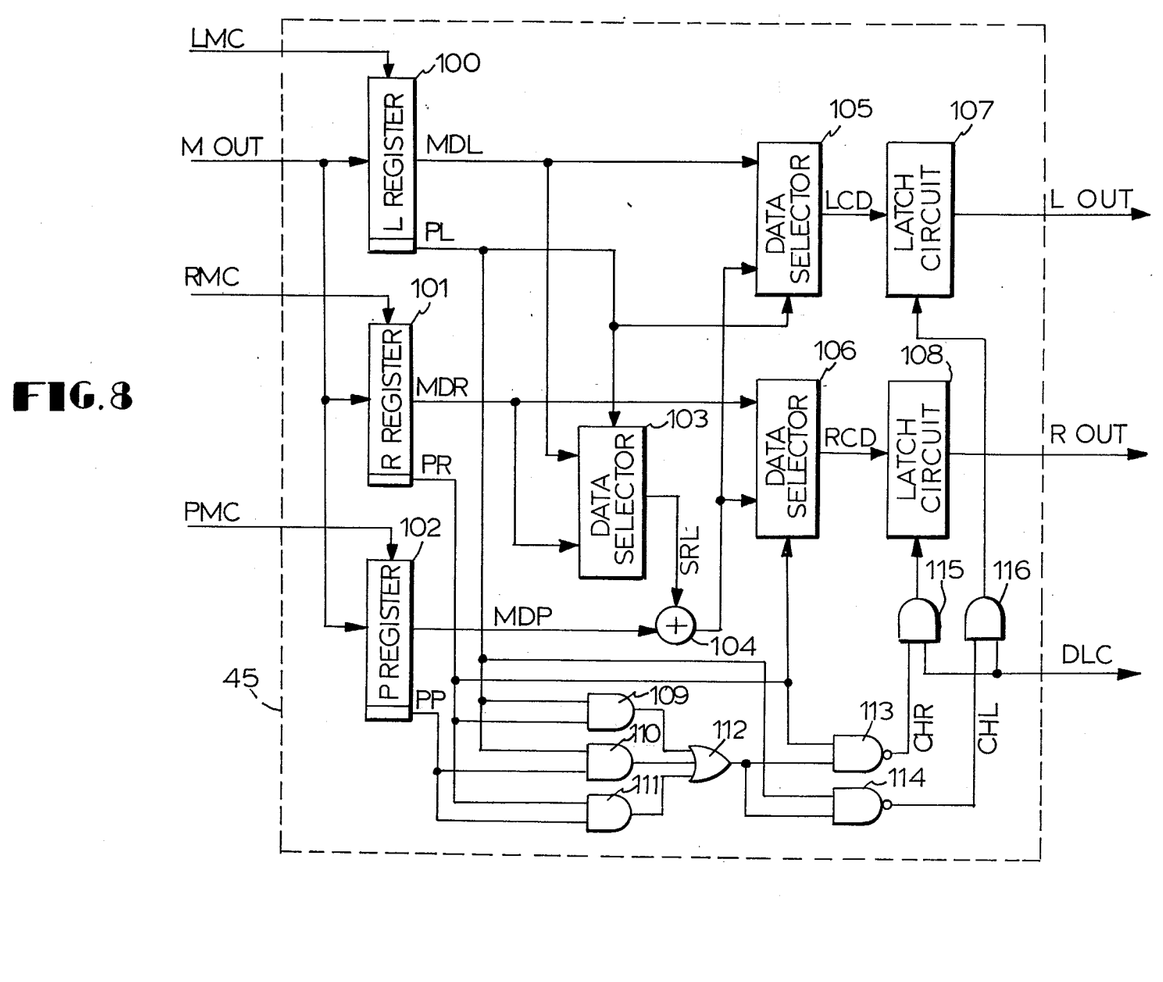
FIG. 8 is a block diagram of a main portion of an example of a circuit for correcting data using first check codes.

FIG. 8 shows an example of a circuit arrangement of a first check code detecting circuit for processing error correction of reproduced data having errors due e.g. to drop out, after the reproduced data are rearranged to the original order of sampled data. Referring thereto, an output MOUT from the memory circuit is sequentially latched to registers 100, 101 and 102 of L, R and P by latch control signals LMC, RMC and PMC, respectively. At the same time, the results of the checking of respective data by the second check code are also latched to the respective registers. PL, PR and PP designate the thus latched signals. A data selector 103 ordinarily passes input signal MDL as an output signal SRL, but when the PL signal is applied to the data selector 103, namely when the MDL signal is erroneous, the data selector 103 passes the MDR signal, as the output signal SRL, to a module 2 adder 104. The module 2 adder 104 is shown in FIG. 3, and sums up the MDP signal and SRL signal per each bit in accordance with module 2, and produces a CRL signal as an output signal. Therefore, the CRL signal is the correct MDL signal produced by the sum of module 2 of the MDP and MRL signals when the MDP signal is correct and the MDL signal is erroneous, while the CRL signal is the correct MDR signal produced by the sum of module 2 of the MDL and MDP signals when the MDP signal is correct and the MDR signal is erroneous.

When the MDL and MDR signals are correct, they are passed through data selectors 105 and 106, respectively, as LCD AND RCD signals, respectively, and are fed to latch circuits 107 and 108, respectively, and then are supplied, as LOUT and ROUT, to D-A converters 46L and 46R. AND gates 109, 110 and 111 and an OR gate 112 are provided for detecting the case where two or more (three) signals among the L, R and P signals are erroneous a. When two or three of L, R and P are erroneous, "1" signal is produced at the output of the OR gate 112, and is applied to NAND gates 113 and 114, which produce, as outputs, CHR and CHL signals, respectively, by the NAND operation of the outputs of the OR gate 112 and the PL and PR signals.

The CHL signal becomes "0" when the data has at least two errors (i.e. when two or three of the L, R and P signals are erroneous) and at the same time the MDL signal is erroneous. The "0" CHL signal suppresses clock signal DLC to the latch circuit 107 by means of an AND gate 116. This indicates that when at least two data are erroneous, previous sampled data remain in the latch circuit 107 because correct data cannot be reproduced in such a situation. That is, this latch circuit 107 in such case operates to hold the previous level.

The CHR signal is quite similar to the CHL signal. That is, when the data has at least two errors and at the same time the MDR signal is erroneous, the latch control signal (clock) DLC is suppressed by the "0" CHR signal, so as to cause the latch circuit 108 to hold its previous level.

As is apparent from the above description, when this invention is applied to a PCM tape recorder, a first check code is produced by the sum of module 2 per bit of A-D-converted data obtained by the sampling of both the left and right channels at the same time point; and these three pieces of data (two A-D-converted data and the first check code) are recorded at time-base positions spaced by 11.67 blocks from each other in an interleaved arrangement; and a second check code is also additionally recorded for detecting errors due to drop-out. Thus, occurrence of error due to loss of more than one piece of data out of the three pieces of data is suppressed, and erroneous data can be corrected during reproduction.

The second check code is a CRC code of 16 bits. The CRC code of 16 bits has the inherent ability to detect all burst errors below 16 bits, and fails to detect burst errors above 16 bits, which type of error occurs only with a low probability, the probability of the failure being $1/(2^{16}) \cong 1.53 \times 10^{-5}$. Thus, the second check code has a very high level of ability to detect errors. In this connection, the amount of drop-out was measured in a commercially available home-use VTR. The measurement showed about 6000 drop-outs per hour. 98% of the 6000 drop-outs were within the length of one block, whereas the longest drop-out observed extended over the length of 7 blocks. According to this invention, the probability of failure to detect code errors due to drop-out, by using the 16-bit CRC signal, is only one time per about 11 hours. Thus, from a practical point of view, this invention does not cause any problem in this connection.

Further, the failure, due to loss of at least two pieces of data, of correcting data from recorded signals digitalized in accordance with this invention happened only twice per hour during the experiment.

Thus, by the digitallized signals and recording/reproducing apparatus according to this invention, data errors due to drop-out can be greatly improved. In addition, the first check code can also be produced by the sum of the left and right signals, but such method is not very advantageous because the length of such a first check code becomes 14 bits which causes a very high bit rate, and because an adder becomes necessary which causes the hardware to increase in size.

Further, according to this invention, by performing the signal interleaving as in FIG. 5, data correction can always be carried out for all drop-outs having a length of not more than 11 blocks, so that substantially complete data correction can be achieved under normal condition.

In the above example, the first check code is produced by the sum of module 2 per bit of the data for the simultaneously sampled stereophonic left and right signals, but as apparent from the foregoing, such a check code can be produced from any combination of data. For example, the first check code can be produced by combining two neighboring pieces of data in the same channel, with the two pieces of data and the first check code being interleaved.

Further, instead of producing a first check code from two pieces of data, a first check code can be produced by the sum of module 2 per bit of three pieces of data, with the three pieces of data and such first check code being interleaved. In this case, it is apparent that complete data correction can be achieved if the dropped data is only one of the four pieces of data. This concept can be expanded in general to N pieces of data. By producing a first check code from these N pieces of data, and interleaving these (N+1) pieces of data, complete data correction can be achieved if only one of the pieces of data is erroneous.

What is claimed is:

1. A digital audio signal recorder for digitallizing analog signals in an audio frequency band to pulse-code-modulated signals and for recording the digitallized signals on a recording medium, the recorder comprising: first check code generating means for producing a first check code signal by the sume of module 2 per bit of signals for individual pieces of digitallized data sampled at a given time; memory means connected to said first check code generating means for receiving the output of signals for said pieces of data in a set of signals for the set of pieces constituted by the individual pieces of sampled data and said first check code at addresses in said memory means spaces from each other along a time axis by a time interval greater than the expected time interval of the dropped-out signal; second check code generating means connected to said memory means and for producing a second check code signal and adding it to the signals of said set; and a recording means connected to said second check code generating means for receiving the output from said second check code generating meand and recording it on a recording medium.

2. A digital audio signal recorder as claimed in claim 1, wherein said first check code generating means comprises means for producing said first check code signal by the sum of module 2 per bit of individual pieces of data which are sampled from stereophonic left and right signals simultaneously or at close time points.

3. A digital audio signal recorder as claimed in claim 1, wherein said second check code generating means comprises means for producing a second check code signal for each of a plurality of neighboring blocks, each block being composed of a plurality of said sets.

4. A digital audio signal recorder as claimed in claim 1, wherein said memory means comprises means for carrying out spaced arrangement of said signals for the pieces of data contsituting said sets in positions in which the signals are equidistantly spaced along a time axis with the length of the time axis for all of the signals for said sets the same as that for the signals for all of the signals for the sampled data and the signals for the corresponding first check codes, and with the distance along the time axis between the signals for the individual pieces of data and the first check code in each set being greater than the distance prior to the cyclic spaced arrangement, and the order of the signals for the individual pieces of data and the first check code in each set being the same as that prior to the cyclic spaced arrangement, whereby complete interleaving the signals in a constant signal length is obtained.

5. A digital audio signal recorder as claimed in claim 1, wherein said memory means comprises means for memorizing the signals for said pieces of data and the first check code at positions spaced equidistantly along a time axis by delaying said signals.

6. A digital audio signal reproducing apparatus for reproducing digitallized signals produced by digitallizing analog signals in an audio frequency band to pulsecode-modulated signals, producing a first check code signal corresponding to the individual pieces of data sampled at a given time by the sum of module 2 per bit of the individual pieces of data, arranging the signals for the pieces of data in a set constituted by the individual pieces of data and the first check code at addresses spaced from each other along a time axis, and adding a second check code signal to the signals for said set, and which digitallized signals are recorded on a recording medium, said apparatus comprising: means for reproducing the recorded signals from the recording medium; a second check code detecting means connected to said signal reproducing means for checking for the presence of the second check code signal in the reproduced signals; reproduction memory means connected to said second check code detecting means for arranging the order of the reproduced signals in the original order of signals prior to their arrangement at spaced addresses for recording; and output means connected to said reproduction memory means for supplying a missing piece of data in a set by the sum of module 2 per bit from remaining signals in said set when said second check code detecting means detects that data is missing due to failure to detect the presence of the second check code signal.

7. A digital audio reproducing apparatus as claimed in claim 6, wherein said output means comprises means for, when two or more of pieces of data in a set are detected as missing by said second check code detecting means, producing as an output signals for a previous set.

8. A digital audio reproducing apparatus as claimed in claim 6, wherein said output means comprises means for, when two or more of pieces of data are detected as missing by said second check code detecting means, producing as an output an arithmetic mean of signals for a previous set and signals for a subsequent set.

9. A method of forming digitally coded signals, comprising: generating a first check code signal by the sum of module 2 per bit of signals for individual pieces of digitallized data sampled at a given time; and positioning said signals for the individual pieces of data and for said first check code and a second check code signal for correcting data omission at positions spaced from each other along a time axis by a time interval greater than the expected time interval of the dropped-out signal.

10. A method as claimed in claim 9, wherein individual pieces of data are sampled from stereophonic left and right signals simultaneously or at close time points.

11. A method as claimed in claim 9, wherein positioning said signals comprises arranging the signals in blocks, each block being constituted by a plurality of sets of signals, each set having the signals for individual pieces of data and the corresponding first check code, and providing a single check code signal for a plurality of blocks of signals.

12. A method as claimed in claim 9, wherein the step of positioning said signals comprises arranging a plurality of sets of signals each having signals for individual pieces of data and for a first check code in a cyclic spaced arrangement for positioning the signals at positions equidistantly spaced along a time axis with the length of the time axis for the signals of the sets after said arrangement being the same as that before said arrangement and with the distances between the signals for the individual pieces of data and the signal for the first check code in each set after said arrangement being greater than the distances before said arrangement, and the order of the signals for the individual pieces of data and the signal for the first check code in each set after said arrangement being the same as that before said arrangement, for completely interleaving the signals in a constant signal length.

13. A method as claimed in claim 9 in which the step of positioning said signals comprises delaying said signals for positioning them at equidistantly spaced positions along the time axis.

* * * * *